April 14, 1942.  F. J. WESTROPE  2,279,648

VISOR ASSEMBLY

Filed April 26, 1941

Inventor
Frederick J. Westrope
By
Attorneys

Patented Apr. 14, 1942

2,279,648

UNITED STATES PATENT OFFICE 2,279,648

VISOR ASSEMBLY

Frederick J. Westrope, Pleasant Ridge, Mich., assignor, by mesne assignments, to Reconstruction Finance Corporation, Detroit, Mich., a corporation of the United States Application April 26, 1941, Serial No. 390,581

10 Claims. (Cl. 296—97)

This invention relates to vehicle glare shields or visors and in particular to such visors which are rotatable around a supporting rod and also slidable therealong.

One object of this invention is to provide a vehicle visor assembly which will not only releasably hold the visor in various positions along the supporting rod and at various angles around it, but also which will be free from rattles and the noises or vibration caused thereby.

Another object is to provide a vehicle visor assembly having a minimum of working parts and arranged to facilitate rapid assembly and inexpensive construction, so that the device is well adapted to mass production methods.

Another object is to provide a vehicle visor assembly wherein the same means which yieldably and frictionally holds the visor in its adjusted position relatively to its supporting rod also serves to prevent rattles and wobbling between the visor and that rod.

Another object is to provide a vehicle visor assembly consisting of a supporting rod with a squared portion carrying a sleeve with a squared bore, the sleeve being mounted to move longitudinally with the visor and engaged by a spring mounted on the visor and serving to urge the sleeve against the squared portion of the supporting rod so as to hold the visor in various positions of rotation around the supporting rod.

Another object is to provide a vehicle visor assembly as set forth in the preceding object wherein the supporting rod is also engaged by a spring mounted on the visor and serving to frictionally and yieldingly hold the visor in any desired position of adjustment longitudinally along the supporting rod.

In general, the vehicle visor assembly of this invention includes a supporting rod with a squared portion carrying a sleeve with a bore of square cross-section. The sleeve is retained by tabs from the visor tube to move along with the visor as the latter is moved longitudinally along the supporting rod. A spring mounted on the visor tube urges the sleeve against the squared shaft and creates sufficient friction to hold the visor in any position of adjustment around the supporting rod as an axis, and at the same time serves in part to prevent rattling between the rod and visor tube. The remaining portion of the supporting rod is of circular cross-section and is engaged by another spring, which exerts sufficient friction to releasably hold the visor in any desired position of adjustment longitudinally along the supporting rod, and at the same time to cooperate with the previously-mentioned spring in preventing rattling between the visor tube and visor-supporting rod.

This arrangement, according to the present invention, provides a vehicle visor assembly which is adjustable to any desired position, is yieldingly held in that position without rattling, and yet which is simple and inexpensive. The arrangement of the various parts is such that the visor is quickly assembled with the minimum of labor cost and hence can be sold for a very low price. By eliminating rattles, this construction solves a long-standing problem in the manufacture and use of visors. Hitherto, such visors have quickly developed rattles during use, due to the wobble of the visor relatively to the supporting rod. In large-scale manufacture, there is a variation in the size of the visor tubes and it is difficult to maintain a sufficient clearance between the moving and fixed parts and at the same time provide for cheap and rapid assembly. The visor of the present invention, however, solves both the problem of cheap construction and rapid assembly and also the problem of rattling, since the same springs which serve to frictionally hold the visor in its adjusted positions also serve to prevent rattling.

Figure 1:
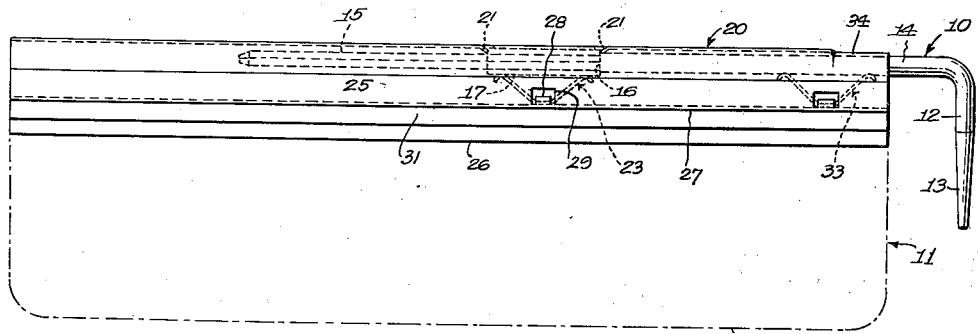
Figure 1 is a front elevation of a vehicle visor assembly according to the preferred embodiment of the present invention.
Figure 2:
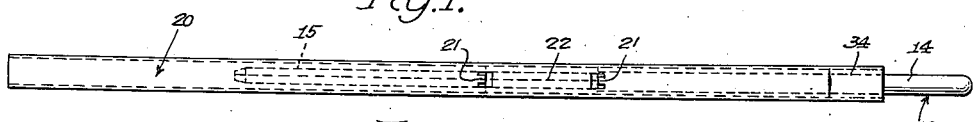
Figure 2 is a top plan view of the vehicle visor assembly shown in Figure 1.
Figure 3:
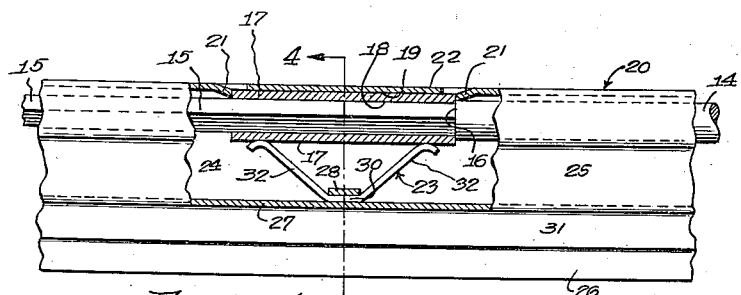
Figure 3 is an enlarged fragmentary view of the visor assembly shown in Figure 1, broken away to show the torsional friction device in longitudinal section.

Referring to the drawings in detail, Figure 1 shows a preferred embodiment of the vehicle visor assembly as consisting of a supporting rod 10 on which is mounted a visor generally designated 11. The supporting rod 10 is provided with a bent end 12 having a tapered portion 13 for mounting in a bracket upon the vehicle, in a manner well known to those skilled in the art and forming no part of the present invention. The supporting rod 10 consists in part of a portion 14 of circular cross-section and a portion 15 of square cross-section and of smaller diameter, the two portions being separated by an annular shoulder 16 (Figure 3). Mounted on the squared rod portion 15 is a sleeve 17 having a bore 18 of square cross-section (Figure 4) and an external surface 19 of circular cross-section.

Figure 6:
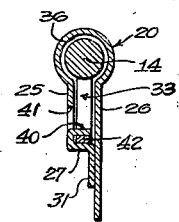
Figure 6 is a cross-section along the line 6—6 in Figure 5.
Figure 7:
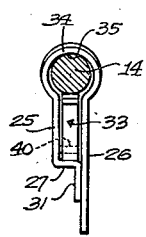
Figure 7 is a cross-section along the line 7—7 in Figure 5.

Mounted on the sleeve 17 is a tubular visor support 20 having tabs 21 punched out of the top thereof and extended downwardly into engagement with the opposite ends of the sleeve 17 so as to cause the latter to travel with the tubular support 20 as the latter is moved longitudinally along the squared rod portion 15. The tubular support 20 is provided with a tubular portion 22 extending around the sleeve 17 and frictionally engaging the outer surface 19 thereof. The sleeve 17 is urged into engagement with the tubular portion 22 by means of a double-armed leaf spring 23 secured in the chamber 24 formed between the downwardly-extending side walls 25 and 26 of the tubular visor support 20 (Figure 6) and secured to the shelf-like portion 27 of the former by the tab 28 struck out of the aperture 29 in the side wall 25 and holding down the central portion 30 of the spring 23. Beyond the shelf-like portion 27, the side wall 25 is bent into a portion 31 engaging the side wall 26 and preferably secured thereto in any suitable way, as by spot welding. The spaced side walls 25 and 26 thus provide a chamber for the operation of the arms 32 of the spring 23, whose upper ends urge the tubular portion 22 of the visor support 20 into fractional engagement with the outer surface 19 of the sleeve 17. The spring 23 also serves to prevent rattling between these parts.

At its end nearest the bent portion 12 of the supporting rod 10, the tubular visor support 20 is provided with a second double-armed spring 33 similar to the first double-armed spring 23 and similarly secured to the bent portion 27 of the side wall 25, hence bearing similar reference numerals. The second spring 33, however, directly engages the supporting rod portion 14 of circular cross-section, hence provides a frictional engagement for holding the visor 11 in any desired position longitudinally along the supporting rod 10. Opposite the second spring 33 the upper surface of the tubular support 20 is bent downwardly as at 34 (Figure 5) to form a portion having its inner surface 35 directly in engagement with the top of the supporting rod portion 14. Elsewhere, however, there is a clearance space 36 between the top of the rod portion 14 and the inner surface of the visor support 20. The visor panel 37 (Figure 1) is then secured to the side wall portions 26 and 31 in any suitable way, such as by metal staples, and the parts are then covered by a cloth or other material as desired.

Figure 4:
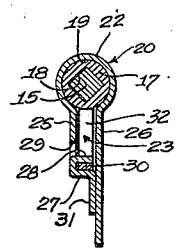
Figure 4 is a cross-section along the line 4—4 in Figure 3.
Figure 5:
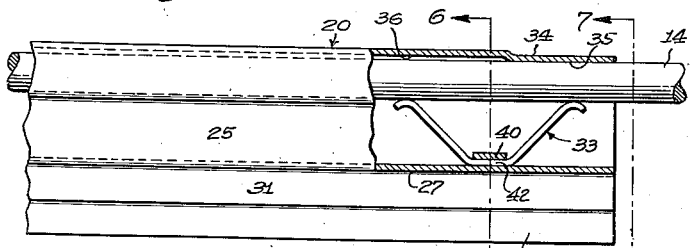
Figure 5 is an enlarged fragmentary view of another portion of the visor assembly shown in Figure 1 broken away to show the longitudinal friction device in longitudinal section.

The visor and its associated parts are assembled by sliding the sleeve 17 upon the squared portion 15 of the supporting rod 10. The tubular visor support 20 is then slid over the rod 10 and sleeve 17 until the latter comes to rest between the tabs 21, whereupon the tabs 21 are bent downwardly against the opposite ends of the sleeve 17. Meanwhile, the arms 32 of the two-armed spring 23 have engaged the under surface of the sleeve 17 and forced its outer surface 19 into engagement with the inner surface of the portion 22 of the tubular visor support 20 (Figure 4). Meanwhile, the second double-armed spring 33 has come to rest in engagement with the supporting rod portion 14 of circular cross-section (Figure 5). The visor assembly is then mounted on an appropriate bracket (not shown) by means of the tapered portion 13 of the supporting rod 10, and this bracket is secured to the vehicle in any conventional way in a position where the vehicle panel 37 will shade the eyes of the driver or passenger in the vehicle from glaring sunlight or from the headlight glare of approaching vehicles.

In the operation of the invention, the operator slides the visor 11 along the supporting rod 10 until it reaches a desired position. In this connection, the second double-armed spring 33 urges the tubular portion 34 into frictional engagement with the upper surface of the supporting rod portion 14 and holds the parts in releasable engagement. As the tubular support 20 moves along the rod 10, the sleeve 17 moves along the squared rod portion 15. The operator then adjusts the visor 11 by swinging it around the axis of the supporting rod 10 and releases it when it has reached the desired position. The two-armed spring 23 then urges the portion 22 of the tubular support 20 into frictional engagement with the sleeve 17 so that the parts are yieldingly held together in their adjusted position.

Thus the visor 11 is held firmly, yet releasably, in frictional engagement with the supporting rod 11 at any desired position, both longitudinally along the rod and arcuately around the rod. The two-armed springs 23 and 33 urge the parts together with sufficient force to apply this frictional engagement, and at the same time these springs serve to prevent rattling between the parts. In previous visor assemblies, this rattling has been a serious problem which is noisy and annoying. The springs 23 and 33 thus not only serve to apply this frictional force but also serve to prevent the rattling which ordinarily occurs.

While a specific embodiment of the invention has been described and illustrated, it will be understood that various modifications may be made within the scope of the appended claims without departing from the spirit of the invention.

What I claim is:

1. In a visor assembly, a supporting rod, a sleeve mounted on said rod for motion longitudinally therealong, a visor support engaging said sleeve, a visor mounted on said visor support, yielding means for urging said visor support into releasable engagement with said sleeve, and additional yielding means for urging said visor support into releasable engagement with said supporting rod.

2. In a visor assembly, a supporting rod, a sleeve mounted on said rod for motion longitudinally therealong, a visor support engaging said sleeve, a visor mounted on said visor support, yielding means for urging said visor support into releasable engagement with said sleeve, additional yielding means for urging said visor support into releasable engagement with said supporting rod, and means for securing said visor support to said sleeve for motion therewith along said supporting rod.

3. In a visor assembly, a supporting rod, a sleeve mounted on said rod for motion longitudinally therealong, means for preventing relative rotation between said sleeve and said rod, a visor support engaging said sleeve, a visor mounted on said visor support, yielding means for urging said visor support into releasable engagement with said sleeve, and detent means on said support and engaging said sleeve for securing said visor support to said sleeve for motion together along said supporting rod.

4. In a visor assembly, a supporting rod, a sleeve mounted on said rod for motion longitudinally therealong, means for preventing relative rotation between said sleeve and said rod, a visor support engaging said sleeve, a visor mounted on said visor support, yielding means for urging said visor support into releasable engagement with said sleeve, and additional yielding means for urging said visor support into releasable engagement with said supporting rod.

5. In a visor assembly, a supporting rod, a sleeve mounted on said rod for motion longitudinally therealong, a visor support engaging said sleeve, a visor mounted on said visor support, a spring disposed between said visor support and said sleeve and urging said visor support into releasable engagement with said sleeve, and a second spring disposed between said visor support and said supporting rod and urging said visor support into releasable engagement with said rod.

6. In a visor assembly, a supporting rod having a flattened portion therealong, a sleeve having a correspondingly flattened bore mounted on said flattened rod portion for motion therealong, a tubular visor support encircling and frictionally engaging and telescoping with said sleeve, a visor mounted on said visor support, and yielding means for urging said visor support into releasable engagement with said sleeve.

7. In a visor assembly, a supporting rod having a flattened portion therealong, a sleeve having a correspondingly flattened bore mounted on said flattened rod portion for motion therealong, a visor support engaging said sleeve, a visor mounted on said visor support, yielding means for urging said visor support into releasable engagement with said sleeve, and additional yielding means for urging said visor support into releasable engagement with said supporting rod.

8. In a visor assembly, a supporting rod having a flattened portion therealong, a sleeve having a correspondingly flattened bore mounted on said flattened rod portion for motion therealong, a visor support engaging said sleeve, a visor mounted on said visor support, yielding means for urging said visor support into releasable engagement with said sleeve, and additional yielding means spaced apart longitudinally from said first-mentioned yielding means for urging said visor support into releasable engagement with said supporting rod.

9. In a visor assembly, a supporting rod having a flattened portion therealong, a sleeve having a correspondingly flattened bore mounted on said flattened rod portion for motion therealong, a visor support engaging said sleeve, a visor mounted on said visor support, and yielding means for urging said visor support into releasable engagement with said sleeve, said visor support having a clearance space between one end thereof and said sleeve free from direct engagement with said rod.

10. In a visor assembly, a supporting rod having a portion thereof of squared cross-section, a sleeve having a corresponding bore of square cross-section slidably mounted on said squared rod portion, a tubular visor support encircling and frictionally engaging and telescoping with said sleeve, a visor mounted on said visor support, and yielding means for urging said visor support into releasable engagement with said sleeve.

FREDERICK J. WESTROPE.